United States Patent [19]

Woodbury et al.

[11] 4,313,257
[45] Feb. 2, 1982

[54] ANNEALING METHODS FOR IMPROVING PERFORMANCE OF A RADIATION SENSOR

[75] Inventors: Henry H. Woodbury, Scotia; Robert S. Lewandowski, Amsterdam, both of N.Y.

[73] Assignee: General Electric Company, Schenectady, N.Y.

[21] Appl. No.: 95,291

[22] Filed: Nov. 19, 1979

[51] Int. Cl.³ .......................... G02F 1/01; C09K 11/24
[52] U.S. Cl. ............................ 29/592 R; 252/301.4 H
[58] Field of Search .................. 29/592; 252/301.4 H; 250/361

[56] References Cited

U.S. PATENT DOCUMENTS

Re. 30,156  11/1979  Brinckmann ................. 252/301.4 H
3,087,060   4/1963   Omohundro ..................... 250/361

Primary Examiner—Jimmy C. Peters
Attorney, Agent, or Firm—Geoffrey H. Krauss; James C. Davis; Marvin Snyder

[57] ABSTRACT

A scintillation member, such as of thallium-doped cesium iodide and the like, is used with a photodetector to form a radiation-responsive sensor. The scintillation member is annealed, by heating followed by slow cooling, to decrease the hysteresis response of the sensor.

11 Claims, 3 Drawing Figures

ANNEALING METHODS FOR IMPROVING PERFORMANCE OF A RADIATION SENSOR

BACKGROUND OF THE INVENTION

The present invention is directed toward radiation sensors and, more particularly, to novel methods for decreasing the hysteresis response of a radiation-responsive sensor by annealing of a member of radiation-conversion phosphor used therein.

Sensors used for detecting radiation flux, such as the x-ray flux detectors used in computed tomography systems, are known to the art. Such sensors may consist of a bar of a conversion material, such as thallium-doped cesium iodide (CsI:Tl), which acts to convert x-ray flux to optical photons, and a photon detector positioned adjacent to the bar of conversion material, for converting the optical photons into an electric current, which may be amplified and subsequently processed to determine the x-ray flux incident upon the conversion material bar of the radiation sensor. The phosphor utilized in such a scintillation detection system has been found to be subject to a hysteresis effect, i.e. a reversible change in the optical photon output of the scintillation phosphor, with time and under constant radiation excitation. This phenomenom results in errors between consecutive measurements of incident radiation flux in scintillation detector systems. In radiation detection systems, such as computed tomography systems, where a high degree of accuracy is required, these errors have proven to be extremely undesirable. Accordingly, a method for reducing the hysteresis of the scintillation phosphor member, utilized in a radiation detector, is highly desirable.

BRIEF SUMMARY OF THE INVENTION

In accordance with the invention, a member of scintillation phosphor, to be fabricated into a radiation detector, is annealed by heating the member to a temperature of between about 500° C. and about 575° C. for between about two hours and about four hours and then cooling the member to room temperature over a time interval of from about ten hours to about sixty hours. The annealing of the scintillation phosphor member provides a scintillation detector having reduced hysteresis, by a factor of three to six times.

In one presently preferred embodiment, wherein the scintillation phosphor is thallium-doped cesium iodide, the sensor scintillation member, having an initial hysteresis of about 6%, is initially heated to about 500° C. and is maintained at the 500° C. temperature for about two hours, before being slowly cooled to room temperature in about 60 hours; the hysteresis of the sensor, using the annealed member, is about 2%. In another embodiment, the member is heated, in an inert (e.g. Argon) atmosphere, to about 575° C. and maintained at the 575° C. temperature for four hours before being cooled to room temperature in about ten hours; the final value of sensor hysteresis is between about 1% to about 2%.

Accordingly, it is an object of the present invention to provide novel methods for reducing the hysteresis in a radiation detector of the scintillation phosphor type, by thermal annealing.

This and other objects of the present invention will become apparent upon consideration of the following detailed description, taken in conjunction with the drawings.

DETAILED DESCRIPTION OF THE INVENTION

Figure 1:
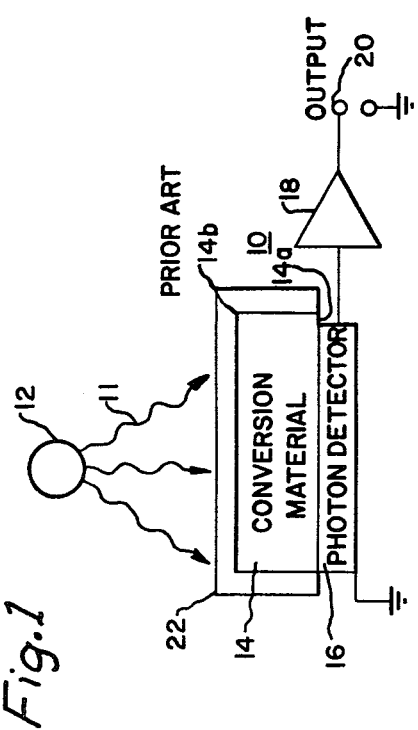
FIG. 1 is a schematic representation of a prior art radiation detection sensor and useful in understanding the principles of the present invention.

Referring initially to FIG. 1, a prior art radiation sensor 10, for detecting radiation 11 from a source 12, utilizes a member 14 of a material converting the radiation quanta impingent thereon to optical photons. The photons are emitted from a surface of member 14, e.g. back surface 14a opposite a front surface 14b upon which surface radiation quanta 11 impinge. A photon detector 16 is positioned adjacent to the surface 14a from which the optical photons are emitted and absorbs the optical photons for conversion to an electric current having a magnitude responsive to the magnitude of the photon flux. The output of photon detector 16 is coupled to an amplifier 18 for providing an electrical output, at terminal 20, responsive in magnitude to the magnitude of the flux of radiation quanta 11 incident upon the sensor. Advantageously, the surfaces of scintillation member 14 not adjacent to photon detector 16 are covered by a thin layer 22 of an optically reflective material having relatively low attenuation to radiation quanta 11.

Photon detector 16 may be any photosensor, such as a photomultiplier and the like, sensitive to the optical photons. Preferably, photon detector 16 includes at least one phototransistor or photodiode, and scintillation member 14 is formed on a scintillation phosphor, such as thallium-doped cesium iodide (CsI:Tl), sodium-doped cesium iodide (CsI:Na), thallium-doped sodium iodide (NaI:Tl) and the like. Preferably, the CsI:Tl scintillation phosphor is utilized, as CsI:Na and NaI:Tl are both hydroscopic and tend to suffer internal damage with prolonged exposure to moisture. The CsI:Tl phosphor is stable in air up to 90% humidity, before local surface damage occurs. Further, use of relatively simple coatings, such as a plastic-based paint, tends to seal the thallium-doped cesium iodide phosphor member against even 100% humidity. The CsI:Tl phosphor is an excellent absorber for X-ray quanta in the medical energy range, up to about 120 kVp. as may be required for radiation detector use in a computed tomography system, wherein sensor 10 receives pulses of radiation quanta 11, typically at a pluse rate of 60 pulses per second.

Figure 3:
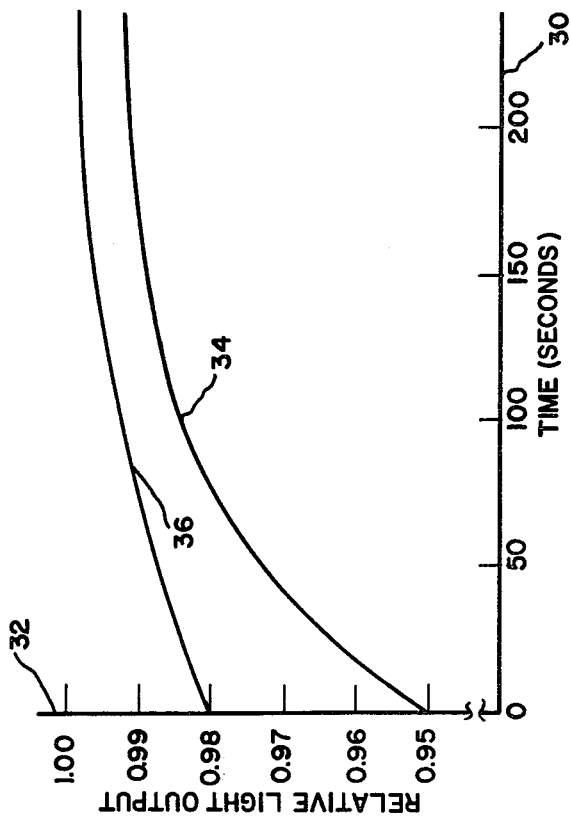
FIG. 3 is a graph illustrating the hysteresis phenomena in sensors using scintillation phosphor members which have, and have not, been thermally annealed in accordance with the processing method of the present invention.

The use of high energy radiation, particularly for medical purposes, generally requires as short an exposure of the patient as possible. Maximum information during an exposure requires that, for passage of the radiation quanta through identically-attenuating objects, proportional magnitude outputs be obtained. It has been found that the output of sensor 10 experiences a time-related change in output, with essentially constant radiation quanta input, due to a change in the relative optical photon output of the scintillation phosphor of member 14. Referring to FIG. 3, increasing values of time, after commencement of radiation quanta impingement upon sensor 10, are plotted along abscissa 30, and increasing values of relative optical photon output are plotted along ordinate 32, A first curve 34 illustrates the time dependent hysteresis effect, wherein the optical photon (light) output of the member of scintillation phosphor material is, at the initiation of X-ray excitation, about 95% of the optical photon output magnitude achieved after constant X-ray excitation for a relatively long time interval, e.g. greater than 400 seconds. It will be seen that the greatest relative optical photon output changes, in a bar of unprocessed CsI:Tl, occur in the first few minutes after X-ray excitation commences. A relaxation is also observed, whereby, if X-ray excitation of the sensor is removed for a sufficiently long time interval, as occurs in changing patients or parameters in a computed tomography apparatus, the scintillation phosphor relative optical photon output returns to the relative output value of about 95% of the long-term, constant-excitation output value. The specific response depends not only on the particular sensor but on the magnitude of the X-ray excitation. These hysteresis effects are sources of undesirable error.

Figure 2:
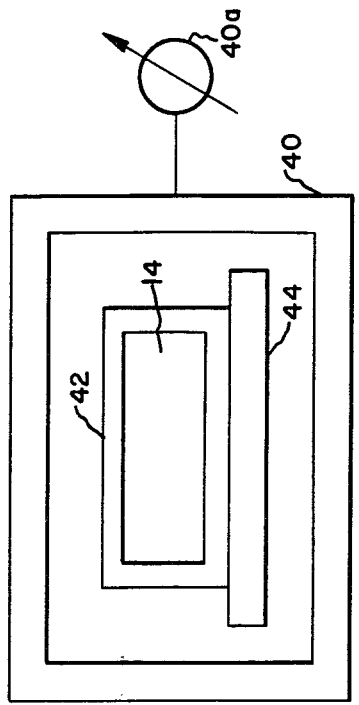
FIG. 2 is a schematic sideview illustrating the method of the present invention.

Referring to FIG. 2, we have found that the hysteresis effect is reduced if conversion material member 14 is annealed as by heating for between about two hours and about seven hours at a temperature of between about 500° C. and about 575° C., in an inert (e.g. argon) atmosphere; the heated member is then slowly cooled to room temperature (about 23° C.) over a time interval of from about ten hours to about sixty hours. Furnace 40 has a temperature control 40a associated therewith for setting the annealing temperature of the member 14, which may be sealed within an envelope 42 (e.g. a quartz tube) and/or encapsulated in an inert atmosphere to reduce sublimation, and may be positioned on a pallet 44 within the furnace.

Annealing of the conversion material member decreases the hysteresis of the sensor, as shown by curve 36 of FIG. 3, wherein the relative optical photon output has only a 1–2% change between the value thereof at the initiation of radiation flux incident upon the detector (after a long period of non-incidence) and a final relative optical photon (light) output value, measured after at least 200 seconds of continuous radiation flux impingement. The annealed scintillation phophor member now appears to have a time constant greater than 1 hour, and has the reversible hysteresis effect, wherein the sensor output returns to the lower relative light output level at initiation of radiation flux conversion, after relatively long periods of non-incidence of the radiation flux. The longer recovery times permits stabilization of the conversion material by pre-exposure to radiation flux prior to actual use in, e.g., a computed tomography apparatus.

Annealing of the conversion material also has been found to improve sensor linearity and yield better sensor-to-sensor uniformity in an array of a multiplicity of such sensors.

Specifically, annealing a member of CsI:Tl at about 500° C. for about two hours, and then slowly cooling to room temperature in about 60 hours, reduces the initial 6% hysteresis to about 2%. Annealing a similar member of CsI:Tl by heating to about 575° C. for 4 hours and then cooling to room temperature in about 10 hours, reduces the initial 6% hysteresis to about 1% to about 2%.

While the present invention has been described with reference to a presently preferred embodiment, many modifications and variations will now occur to those skilled in the art. It is our intent, therefore, to be limited only by the scope of the pending claims and not by the specific preferred embodiment described therein.

What is claimed is:

1. A method for fabricating a sensor providing an electrical output responsive to an incident radiation flux, comprising the steps of:
   (a) providing a member of a material emitting optical photons responsive to incidence of said radiation flux upon said material;
   (b) thermally annealing the member by heating the member to a selected temperature between about 500° C. to about 575° C.; and then cooling the heated member to room temperature; and
   (c) positioning a photon detector to receive the optical photon emissions of the annealed member for forming an output signal of said sensor responsive to the incident radiation flux and having a value of hysteresis less than the hysteresis value of a sensor fabricated with a member which has not been thermally annealed.

2. The method as set forth in claim 1 wherein the member is maintained at the selected temperature for a time internal between about two hours and seven hours.

3. The method as set forth in claim 2, wherein the heated member is cooled to room temperature in a time interval of between about 10 hours and about 60 hours.

4. The method as set forth in claim 3, wherein the member is heated to 500° C. for about 2 hours, and then cooled to room temperature in about 60 hours.

5. The method as set forth in claim 3, wherein the member material is CsI:Tl.

6. The method as set forth in claim 3, wherein the member is heated to about 575° C. for a time interval of about 4 hours; and then cooled to room temperature in about 10 hours.

7. The method as set forth in claim 1, wherein step (b) includes the step of surrounding the member with an inert atmosphere during annealing.

8. The method as set forth in claim 7, wherein the inert atmosphere is comprised of argon.

9. The method as set forth in claim 1, wherein step (b) further includes the step of sealing the member in a quartz tube during at least heating of the member.

10. The method as set forth in claim 9, wherein the step (b) further includes the step of filling the tube with an inert atmosphere prior to sealing.

11. The method as set forth in claim 1, further including the step of enclosing the surfaces of said member not emitting optical photons toward said photon detector with a coating of light-reflective material.

* * * * *